United States Patent [19]
Jacobson

[11] Patent Number: 5,165,996
[45] Date of Patent: Nov. 24, 1992

[54] COATED REFRACTORY COMPOSITIONS AND METHOD FOR PREPARING THE SAME

[75] Inventor: Howard W. Jacobson, Wilmington, Del.

[73] Assignee: E. I. Du Pont de Nemours and Company, Wilmington, Del.

[21] Appl. No.: 520,582

[22] Filed: May 8, 1990

[51] Int. Cl.⁵ .............................................. B32B 18/00
[52] U.S. Cl. ................................... 428/404; 428/698; 428/699; 428/701
[58] Field of Search ................. 428/404, 698, 699, 701

[56] References Cited

U.S. PATENT DOCUMENTS

| 4,249,913 | 2/1981 | Johnson et al. | 428/404 |
| 4,632,876 | 12/1986 | Laird et al. | 428/404 |
| 4,801,510 | 1/1989 | Mehrotra et al. | 428/698 |
| 4,806,428 | 2/1989 | Cooper et al. | 428/404 |

Primary Examiner—Paul J. Thibodeau
Assistant Examiner—Mark A. Forman

[57] ABSTRACT

A coated refractory composition for making high quality preforms comprising a refractory material selected from a metal refractory carbide, metal refractory nitride, metal refractory boride or diamond having a coating layer of hydrous alumina or a coating layer of anhydrous crystalline alumina, and to a method for enhancing dispersibility and improving oxidation resistance of such compositions.

5 Claims, 5 Drawing Sheets

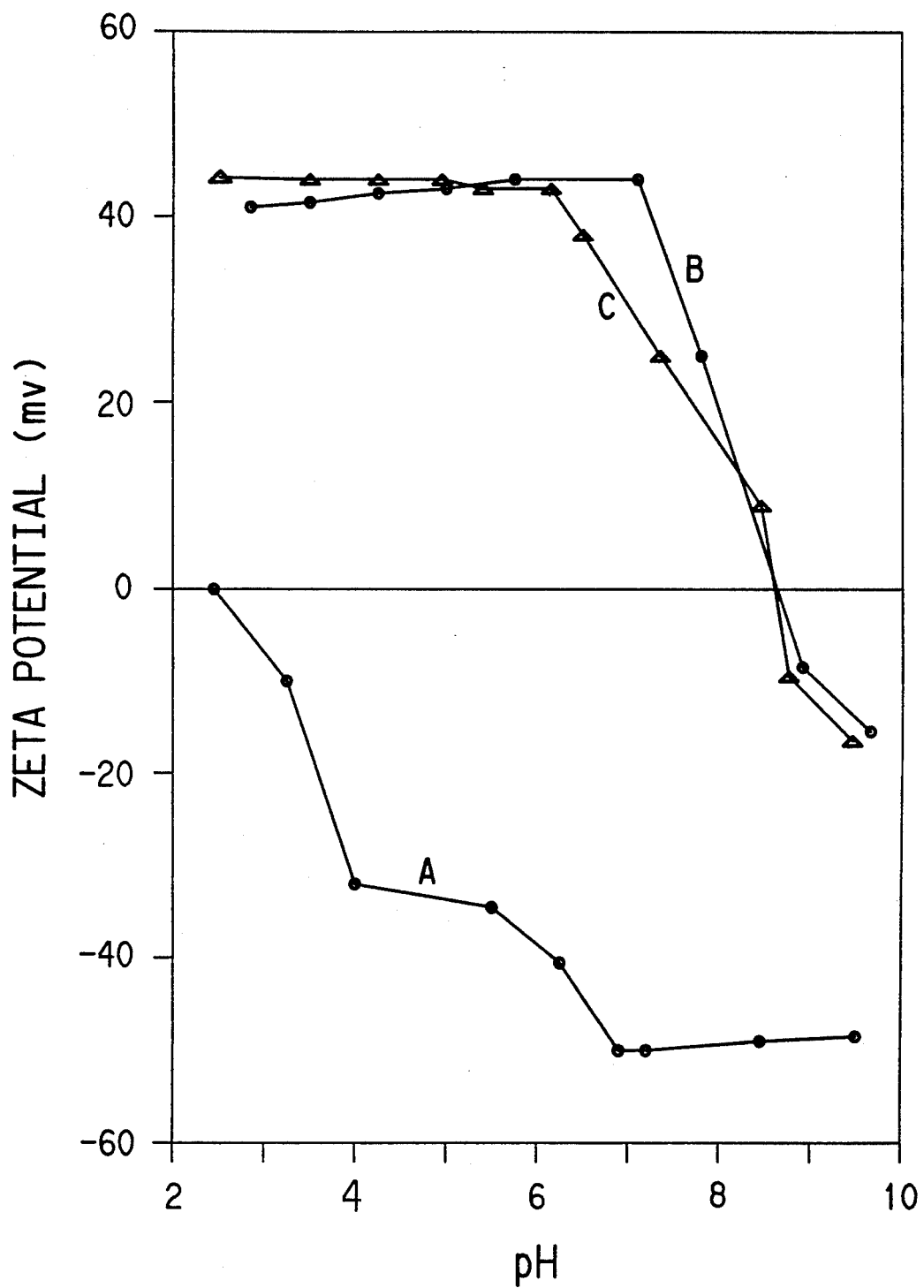

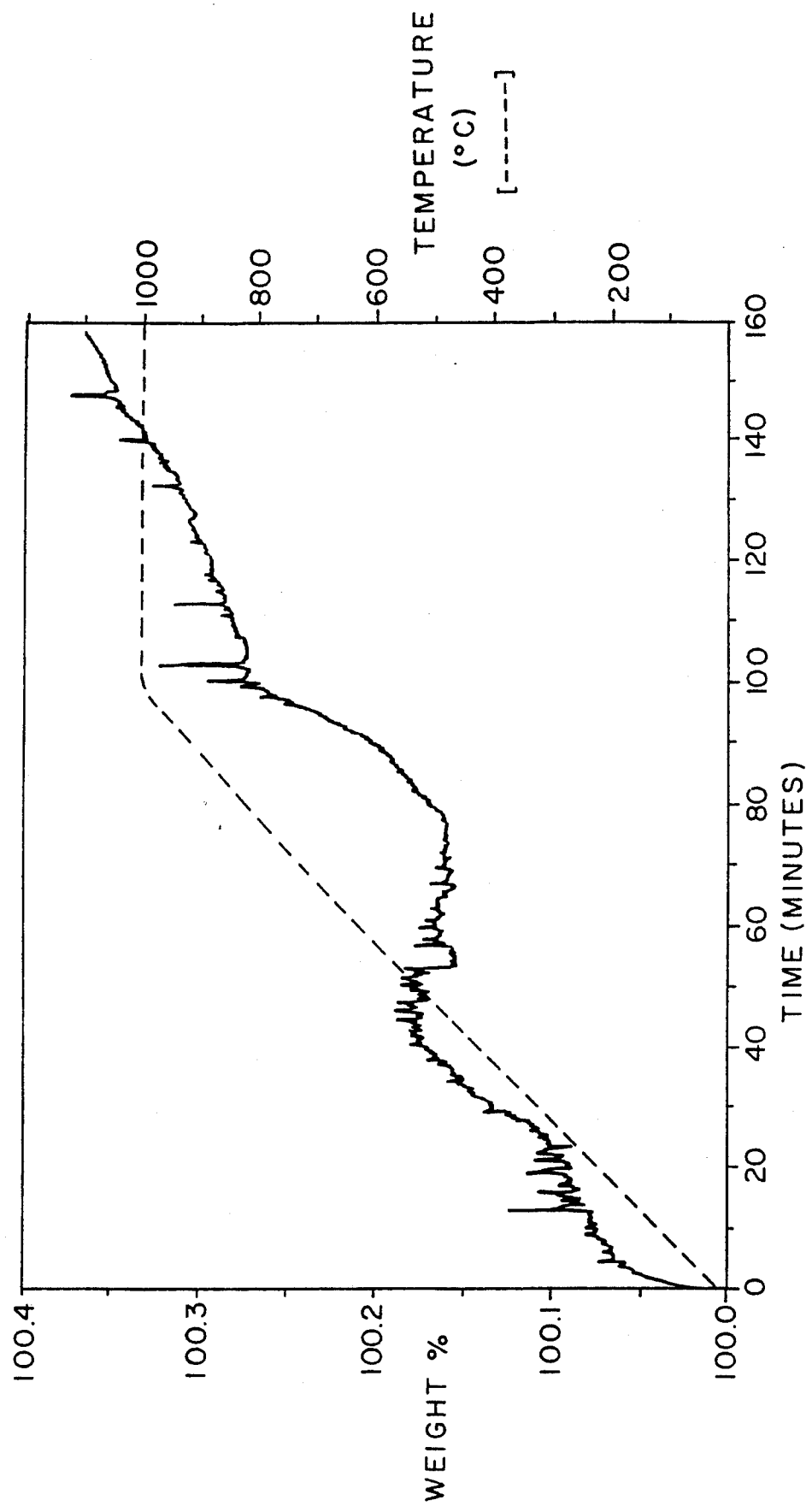

COATED REFRACTORY COMPOSITIONS AND METHOD FOR PREPARING THE SAME

BACKGROUND OF THE INVENTION

The present invention relates to a coated refractory composition for making high quality preforms comprising a refractory material selected from a metal refractory carbide, metal refractory nitride, metal refractory boride or diamond having a coating layer of hydrous alumina, and, more particularly, to a method for enhancing the dispersibility and for improving the oxidation resistance and chemical inertness of such compositions.

U S. Pat. No. 4,249,913 describes a silicon carbide abrasive particle which is coated with alumina to inhibit dissolution in a bonding metal matrix during high temperature processing. The alumina coating, described as a dense, anhydrous and amorphous coating, is applied by sputtering or vapor deposition processes.

U.S. Pat. No. 4,801,510 relates to a composite article comprising 5 to 30 vol % silicon carbide whiskers and 70 to 95 vol % alumina, the articles having a thin coating of alumina. The silicon carbide and alumina in the composite are mixed together by ball milling, hot pressed to form a dense article, then coated with a thin layer of alumina using vapor deposition techniques.

SUMMARY OF THE INVENTION

The present invention is directed to a coated refractory composition for making high quality preforms comprising a refractory material selected from a metal refractory carbide, metal refractory nitride, metal refractory boride or diamond having a coating layer of hydrous alumina whereby the coating layer enhances the dispersibility of such compositions. The invention is further directed to a calcined composition comprising said refractory material having a coating of a crystalline anhydrous alumina whereby the coating layer further improves the oxidation resistance and chemical inertness of such compositions.

Another aspect of the present invention is directed to a method for preparing the same comprising the steps of:
(a) coating an aqueous suspension of a finely divided refractory material with hydrous alumina;
(b) separating, washing and drying said coated refractory; and
(c) optionally calcining at a temperature in the range of from 400° to 1100° C. for at least one hour.

BRIEF DESCRIPTION OF THE DRAWINGS

FIG. 3 is a graphic representation illustrating the higher isoelectric points of the coated refractory compositions of the present invention.

FIG. 4A and FIG. 4B are thermogravimetric analysis plots illustrating improved oxidation resistance of the coated refractory compositions of the present invention.

DETAILED DESCRIPTION OF THE INVENTION

Figure 1:
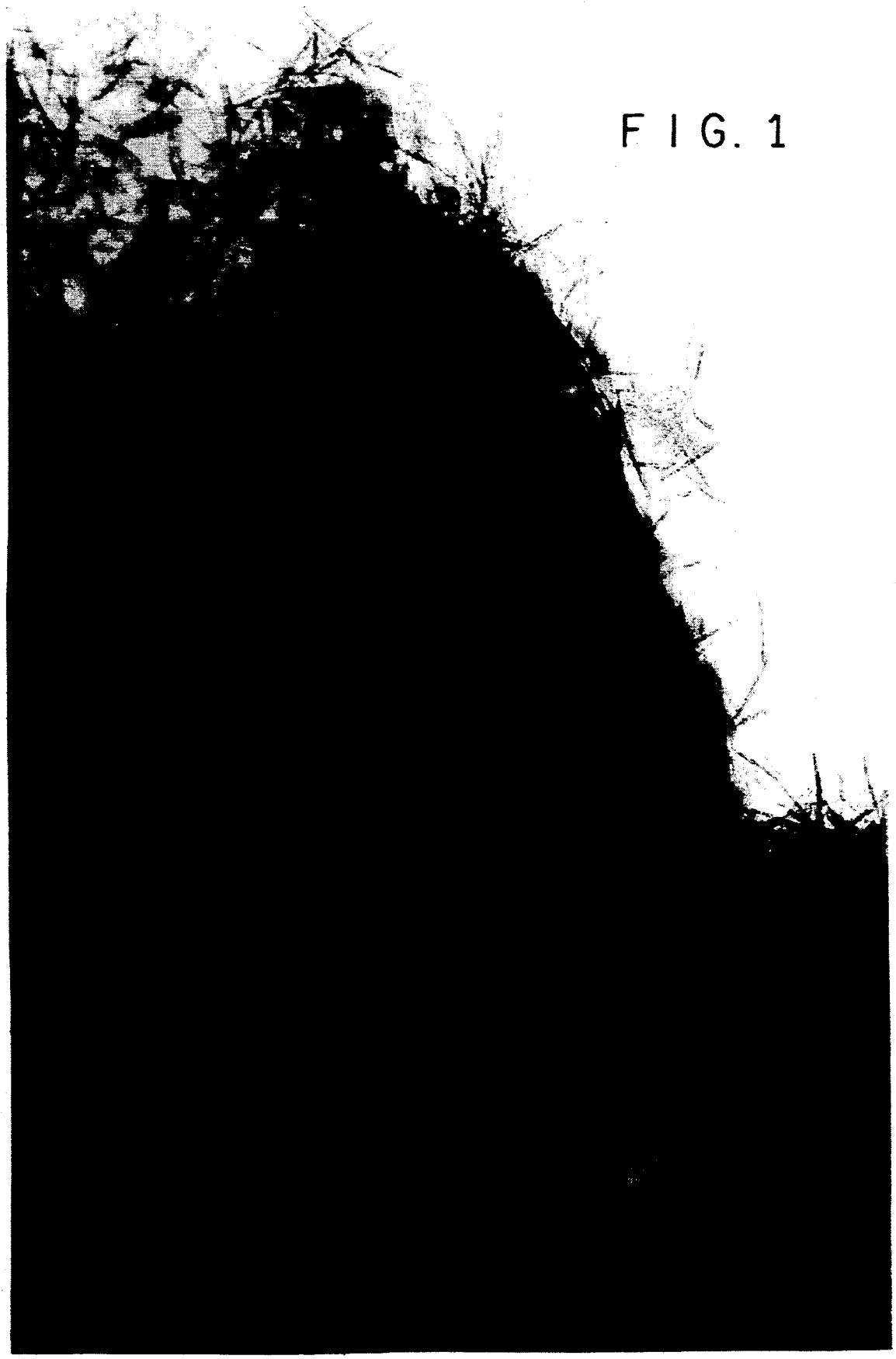
FIG. 1 is a transmission electron micrograph of a hydrous alumina coating on silicon carbide refractory material prepared by the process of the present invention.

The present invention relates to a coated refractory composition demonstrating enhanced dispersibility and improved oxidation resistance and chemical inertness, wherein the composition comprises a refractory material selected from a metal refractory carbide, metal refractory nitride, metal refractory boride or diamond having a coating layer of hydrous alumina, i.e., a mixture of boehmite fine crystals and hydrous amorphous alumina. The coating increases the isoelectric point of the composition to that of alumina. The isoelectric point is defined herein to refer to the pH at which the zeta potential is zero. The increased isoelectric point and surface area relate to enhanced dispersibility of such compositions in water or solvent systems and result in stable aqueous dispersions useful, for example, in slip casting procedures in producing refractory articles.

The refractory material, i.e., substrate is a finely divided solid having an average particle size between 1 to 2500 microns. Generally, the refractory substrate has a surface area in the range of from 0.05 to 20 m$^2$/g. For best results, the refractory substrate has a surface area of 0.2 to 10 m$^2$/g. In practicing the invention, useful refractory materials are metal refractory carbides, metal refractory nitrides, metal refractory borides or diamonds. For example, a refractory carbide such as silicon carbide is a suitable substrate. Other refractory carbides, that are stable in an aqueous medium, such as titanium carbide, tantalum carbide, niobium carbide, zirconium carbide, tungsten carbide, molybdenum carbide, vanadium carbide, hafnium carbide, thorium carbide and uranium carbide can be suitable substrates. In addition, diamonds and water insensitive refractory nitrides such as titanium, zirconium and silicon, and water insensitive refractory borides such as titanium and zirconium can be coated with hydrous alumina by the process of the invention.

The shape of the refractory particles can vary such as equiaxial, acicular and platelet. Suitable substrates are equiaxial particles in the size range of from 1 to 2500 microns, acicular particles having an aspect ratio of from 2 to 200 and an average diameter of from 0.1 to 12 microns and platelets having as aspect ratio of from 5 to 200 and an average diameter of from 5 to 2500 microns. In addition, the refractory substrate should not be soluble in water or dilute acid or base.

The coating on the refractory substrate comprises a layer of hydrous alumina, i.e., a mixture of boehmite alumina and hydrous amorphous alumina. The coating amounts to 0.2 to 12 wt % and typically 3 to 6 wt % of the total composition. The hydrous alumina coating is a mixture of fine crystals of boehmite and hydrous amorphous alumina and consequently the specific surface area is greater than that of the refractory particle and is in the range of from 0.5 to 40 m$^2$/g, typically 2 to 15 m$^2$/g.

The invention is further directed to a calcined composition in which the coating is a crystalline anhydrous alumina such as eta, theta, gamma or alpha phase or transition mixtures thereof, depending upon the calcination conditions. The uncalcined or calcined compositions are also useful for the preparation of high strength, toughened metal matrix and ceramic matrix composites. The coating increases the surface area and the isoelectric point of the compositions of that of alumina and result in enhanced dispersibility, which enable uniform preforms to be made. The enhanced dispersibility is due to the higher isoelectric point to that of alumina and the surface area of the coated refractory. The high quality preforms may be used in making high performance composites. The coating also has a protecting function, for example, the refractory carbides are protected from surface oxidation during high temperature processing under atmospheric conditions. The calcined coated compositions exhibit much improved oxidation resistance.

Another aspect of the present invention is directed to a method for enhancing dispersibility of such compositions in water or solvent systems and improving oxidation resistance and chemical inertness of such compositions. According to the method, the steps for carrying out the present invention comprise:

(a) forming an aqueous suspension of a refractory material, heating to a temperature in the range of between 40° and 95° C. and adjusting the pH in the range of from 5 to 9;

(b) adding an aqueous solution of an aluminum salt selected from the group consisting essentially of alkali metal aluminates, ammonium aluminate, aluminum chloride, aluminum nitrate and the aluminum acetate with stirring and maintaining the temperature and pH for 5 to 60 minutes whereby hydrous alumina precipitates as a coating layer on the surface of said refractory material;

(c) separating, washing, drying the coated refractory at 100° to 300° C.; and (d) optionally calcining at a temperature in the range of from 400° to 1100° C. for at least one hour.

In practicing the invention an aqueous suspension of a finely divided refractory material is prepared. The concentration of solids in the aqueous suspension is not especially critical and can range from 10 to 1000 grams per liter of water. Hydrous aluminum oxide is generated in the presence of the suspended particles at a carefully controlled rate so that all the hydrous aluminum oxide produced forms as a coating on the particles rather than forming as a separate precipitate. Either acidic or basic, water soluble aluminum salts can be used as sources of aluminum oxide, for example, alkali metal aluminates, ammonium aluminate, aluminum chloride, aluminum nitrate and aluminum acetate. Aqueous solutions of aluminum salt are prepared and contain aluminum equivalent to 5 to 40 wt % $Al_2O_3$ and are added to the aqueous suspension. When acidic aluminum salts are used, alkali is added concurrently, again maintaining the pH in the range of 5 to 9 during the coating process. In the case of aluminates, acid is added simultaneously maintaining the pH in the range of 5 to 9 throughout the process. The preferred source of aluminum oxide is sodium or potassium aluminate to which is added mineral acid, typically hydrochloric acid.

The aqueous suspension of the refractory material is heated to a temperature in the range of from 50° to 95° C. and the pH is adjusted in the range of 5 to 9. Typically, the pH is within this range, if it is less than 5, then a few drops of dilute base, or if it is more than 9, then a few drops of dilute acid will bring it into the desired range. To the stirred suspension, the solution of alkali metal aluminate is added dropwise together with mineral acid, for example, 5 to 20% HCl at a rate which maintains the pH between 5 and 9. The thickness of the hydrous alumina coating layer is a function of the amount of alkali aluminate added to the aqueous slurry. At a temperature of from 60° to 90° C. and a mixture pH in the range 7.5 to 9, the hydrous alumina will ordinarily be deposited on the surface of the suspended refractory particles at the rate of 2 to 3 wt %/hour. On completion of the addition, the suspension is stirred for a further 5 to 60 minutes maintaining the same temperature and pH range. This step stabilizes the coating layer of hydrous alumina on the slurried particles.

The coated particles are then isolated, i.e., separated by filtration or centrifugation, washed with water until free from soluble ions, particularly sodium and chloride ions, and dried by heating at 100° to 300° C.

A final calcining step is optional and whereupon calcining the composition additionally exhibits improved oxidation resistance in high temperature processing under atmospheric conditions. The coated refractory composition with the hydrous alumina coating may be calcined by heating in air or an inert atmosphere, e.g. $N_2$ at 400° to 1100° C. for at least one hour. Calcining densifies the coating layer and results in a decrease in specific surface area. The extent to which the surface area decreases depends on the time and temperature of the heating cycle. The coating is converted to an anhydrous crystalline transition alumina which may be in the gamma, eta, theta or alpha alumina phase or transition mixtures thereof, depending on the temperature to which the composition is heated. The calcined compositions may go through additional coating steps and the entire process repeated to further improve the oxidation resistance.

Referring now to the drawings, FIG. 1 is a transmission electron micrograph of hydrous alumina coating on silicon carbide prepared by the process of the present invention. The "whiskers" represent the boehmite alumina and embedded within is hydrous amorphous alumina.

Figure 2:
FIG. 2 is a transmission electron micrograph of a crystalline gamma alumina coating on silicon carbide refractory material prepared by the process of the present invention further comprising the step of calcining.

FIG. 2 is a transmission electron micrograph of a crystalline gamma alumina coating on silicon carbide prepared by the process of the present invention with calcining. The larger crystal is gamma alumina. As compared to FIG. 1, the lacey appearance of the surface is transformed to a more dense surface coating.

The isoelectric point of the compositions of the present invention is a useful measure of surface charge. Stable aqueous dispersions of particles in water or solvent systems are obtained with particles which have an isoelectric points in the range of from about 6 to 9. The isoelectric point is determined by measuring the zeta potential of a suspended particle over a range of pH and ascertaining the pH where the zeta potential is zero.

The coated refractory particles of the present invention exhibit an isoelectric point in the range of from about 6 to 9. In contrast, the isoelectric point of the uncoated refractory particle is usually less than 3. For example, a SiC surface is 2.0 to 2.5, reflecting the presence of silicon dioxide on the surface. Referring now to the drawings, by way of example, FIG. 3 is a graphic representation of zeta potential measurements on aqueous dispersions of 1000 grit silicon carbide (Plot A); the same silicon carbide having a coating of hydrous alumina (Plot B); and the latter after calcining to convert the coating to crystalline anhydrous gamma alumina (Plot C). The isoelectric point occurs at 2.3 in Plot A, 8.6 in Plot B and 8.6 in Plot C, showing the coated products to have a considerably higher isoelectric point than the original silicon carbide. The 8.6 isoelectric point is characteristic of the alumina coating.

Figure 4B:
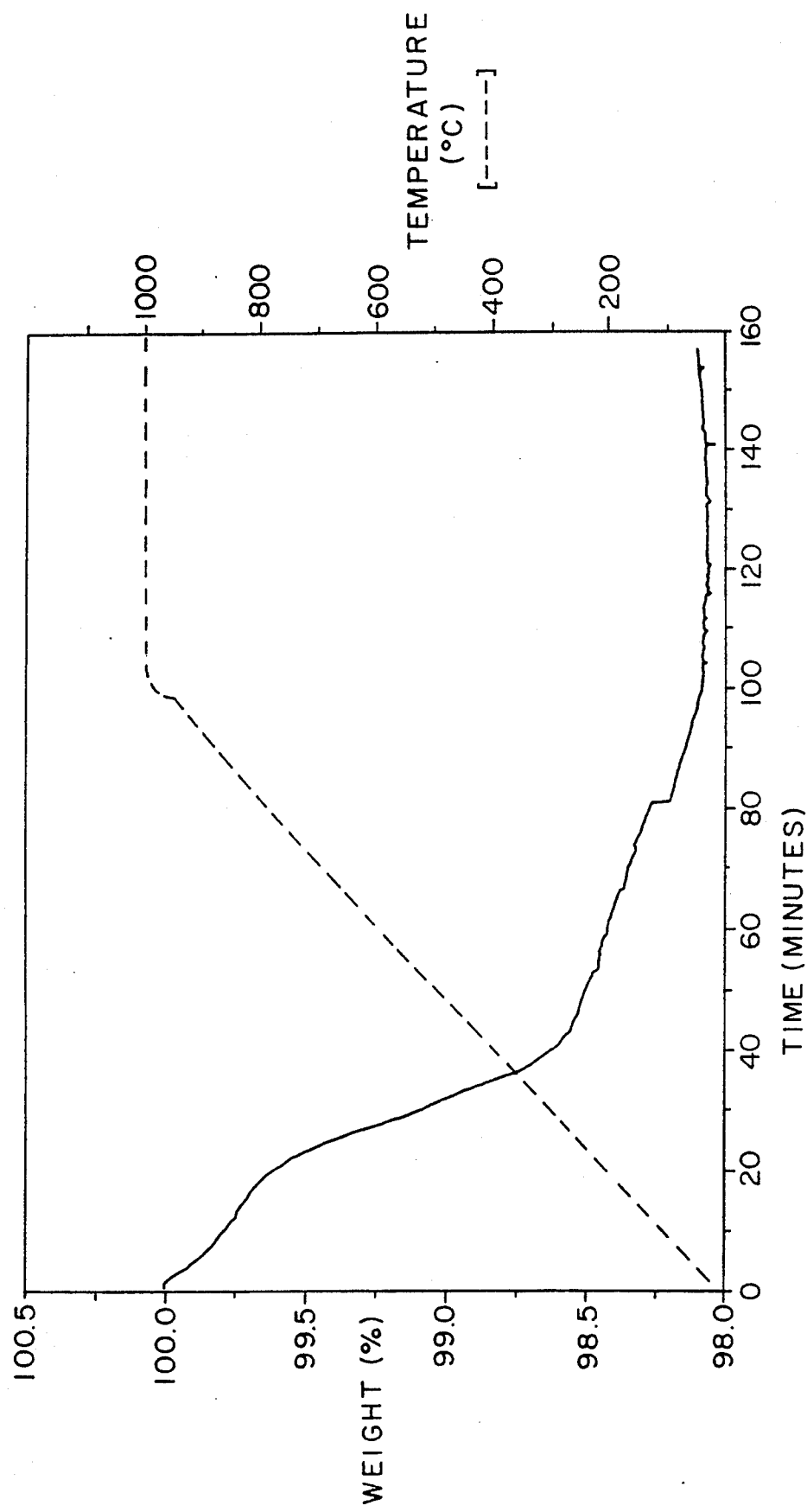

The improved oxidation resistance of a refractory carbide particle is evident from FIG. 4A and FIG. 4B which show Thermogravimetric (TGA) analysis plots which were obtained for a 500 grit silicon carbide powder (FIG. 4A); and the same powder coated with hydrous alumina (FIG. 4B). The rate of temperature increase was 10° C./minute up to 1000° C. followed by a one hour hold at 1000° C. and the air flow was 100 cc/min. FIG. 4A shows a weight increase of 0.36%, attributable to surface oxidation of the silicon carbide particles. The hydrous alumina coated silicon carbide shows a weight decrease of about 2% which reflects dehydration of the hydrous alumina coating and conversion to a crystalline anhydrous transition alumina.

The following procedures were used to characterize the products of the invention. Specific surface area was measured by the BET nitrogen adsorption method. Isoelectric point measurements were made using an automated electrokinetics analyzer known as Pen Ken System 3000 and were manufactured by Pen Ken Inc., Bedford Hills, N.Y. This instrument measured the electrophoretic mobility of particles in a dilute suspension. Measurements were made at different pH levels and by graphically plotting the results, the isoelectric point, i.e., the pH at which the zeta potential was zero, was ascertained. Thermogravimetric analysis (TGA) was done using a DuPont Model 951 Thermogravimetric Analyzer. Elemental analysis was performed by the EDAX procedure. X-ray diffraction was used to identify the crystalline phases present.

The compositions of this invention and the method of preparation are illustrated in more detail in the following examples, but are not intended to limit the scope of the invention.

EXAMPLE 1

This example describes the preparation of SiC refractory material coated with hydrous alumina.

Four hundred and seventy five grams of 500 grit SiC powder, (Norton Company grade 100 GI), having a surface area of 0.56 $m^2/g$, was added to 3 l of water with good agitation in a 4-liter beaker. The stirred aqueous suspension of SiC was heated to 65° C. and the pH was adjusted to 8.5. An aqueous solution of sodium aluminate, [NaAl(OH)$_4$, equivalent of 0.385 g Al$_2$O$_3$/cc; supplied by Vinings Corp.] was added to the SiC suspension and the pH was maintained at 8.5 by the concurrent addition of 20% HCl. After adding 50 ml of the NaAl(OH)$_4$ solution over a period of about an hour, the suspension was stirred at pH 8.5 and a temperature of 65° C. for an additional 30 minutes. All the Al$_2$O$_3$ was precipitated onto the SiC, corresponding to 3.89 wt % Al$_2$O$_3$ based on the product. The solids were recovered by filtering the suspension and washed with deionized water until free from sodium and chloride ions. The hydrous alumina coated SiC was dried overnight in an air oven at 120° C.

The product was found to have a surface area of 10.6 $m^2/g$, measured by nitrogen adsorption, compared with 0.56 $m^2/g$ for the starting SiC.

Isoelectric point (IEP) was measured on aqueous dispersions of the particles using an automated electrokinetics analyzer, (Pen Ken System 3000, manufactured by Pen Ken Inc. of Bedford Hills, N.Y.). The starting SiC had an IEP of 2.3 and that of the coated product was 8.6.

Thermogravimetric analysis (TGA) was conducted using a Du Pont Model 951 Thermogravimetric Analyzer. The rate of temperature increase was 10° C./minute up to 1000° C., followed by a one hour hold at 1000° C. and the air flow was 100 cc/minute. The uncoated SiC showed a weight increase of 0.36% attributable to surface oxidation. The alumina coated SiC showed a weight decrease of about 2%, due to dehydration of the hydrous alumina coating.

EXAMPLE 2

This example describes the preparation of a fine grit SiC refractory material coated with hydrous alumina.

Using the procedure of Example 1, 500 g of Exalon ESK #1200 SiC, having a surface area of 2.3 $m^2/g$ was used. The period of the addition of the sodium aluminate solution was two hours.

The product was found to have a surface area of 17.4 $m^2/g$ compared with 2.3 $m^2/g$ for the starting SiC.

EXAMPLE 3

This example describes the preparation of TiB$_2$ refractory material coated with hydrous alumina.

Using the procedure of Example 1, 500 g of TiB$_2$ powder, (Union Carbide Grade HCT-30), having a surface area of 0.53 $m^2/g$ was used. The period of the addition of the sodium aluminate solution was two hours.

The product was found to have a surface area of 9.4 $m^2/g$ compared with 0.53 $m^2/g$ for the starting TiB$_2$.

EXAMPLE 4

This example describes the preparation of a diamond refractory material coated with hydrous alumina.

Placed 25 g of diamond powder (Beta Diamond Products, Inc. Grade SJK-5) in 800 cc deionized water in a 1 liter beaker on a hot plate. The beaker was equipped with a stirring paddle and pH probe.

The slurry was heated to 65° C.

The pH of the slurry was adjusted to 8.2 with 5 drops of 20% NaOH solution.

Over a period of 2 hours, 0.9 ml of sodium aluminate solution (Vinings Corp.) that contained 0.385 g Al$_2$O$_3$/ml was added dropwise to the stirred bath. The pH was maintained at 8.2 with HCl (0.1M).

After the alumina coating has been applied, the system was stirred 30 minutes at pH=8.2/65° C. to cure the coating.

The coated diamond powder was recovered by filtering, washing free of residual chlorides, and drying 2 hours at 120° C. The coated diamond powder has a surface area of 4.2 $m^2/g$.

What is claimed:

1. A coated refractory particle for making high quality preforms comprising a refractory material having an average particle size between 1 to 2500 microns, said refractory particle being selected from the group consisting of diamond, metal refractory carbides, metal refractory nitrides, metal refractory borides and mixtures thereof having a coating of a mixture of boehmite crystals and hydrous amorphous alumina in amounts of about 0.2 to 12 weight percent of the total coated particle.

2. The coated refractory particle of claim 1 wherein the refractory material is selected from the group consisting of silicon carbide, titanium carbide, tantalum carbide, niobium carbide, zirconium carbide, tungsten carbide, molybdenum carbide, vanadium carbide, hafnium carbide, thorium carbide, uranium carbide, titanium nitride, zirconium nitride, silicon nitride, titanium boride and zirconium boride.

3. The coated refractory particle of claim 2 wherein the refractory material is silicon carbide.

4. The coated refractory particle of claim 1 wherein said coating increases the isoelectric point of said refractory material.

5. The coated refractory particle of claim 4 wherein the coating reduces the the chemical activity of the surface of the refractory material.

* * * * *